(12) United States Patent
Sjöström

(10) Patent No.: US 6,394,562 B1
(45) Date of Patent: May 28, 2002

(54) BAND DEVICE FOR VEHICLE WHEELS

(76) Inventor: Kenneth Sjöström, Brattsbacka 76, Nyåker SE-914 94 (SE)

( * ) Notice: Subject to any disclaimer, the term of this patent is extended or adjusted under 35 U.S.C. 154(b) by 0 days.

(21) Appl. No.: 09/582,201

(22) PCT Filed: Jan. 7, 1999

(86) PCT No.: PCT/SE99/00009
§ 371 (c)(1),
(2), (4) Date: Jul. 5, 2000

(87) PCT Pub. No.: WO99/37525
PCT Pub. Date: Jul. 29, 1999

(30) Foreign Application Priority Data

Jan. 7, 1998 (SE) .............................................. 9800014

(51) Int. Cl.[7] ........................................... B62D 55/205
(52) U.S. Cl. ..................... 305/19; 305/196; 305/198; 152/185.1
(58) Field of Search .................. 305/19, 185, 195, 305/196, 198; 152/185, 185.1, 225 R, 226, 227

(56) References Cited

U.S. PATENT DOCUMENTS

| | | | |
|---|---|---|---|
| 1,370,757 A | | 3/1921 | Moon |
| 2,917,095 A | * | 12/1959 | Galanot ..................... 305/19 X |
| 2,973,995 A | * | 3/1961 | Weier ........................ 305/19 X |
| 4,089,565 A | | 5/1978 | Loegering et al. |
| 4,408,646 A | * | 10/1983 | Forsyth ............... 152/185.1 X |
| 5,044,415 A | * | 9/1991 | Ishihara ............... 152/185.1 X |
| 5,616,193 A | * | 4/1997 | Nordstrom et al. ...... 152/185.1 |
| 5,641,213 A | * | 6/1997 | Arsenault ..................... 305/40 |

FOREIGN PATENT DOCUMENTS

| | | |
|---|---|---|
| GB | 361673 | 11/1931 |
| SE | 353 688 | 2/1973 |

* cited by examiner

*Primary Examiner*—Russell D. Stormer
(74) *Attorney, Agent, or Firm*—Jacobson Holman, PLLC

(57) ABSTRACT

A device constituting a part of a band. The band being intended to be arranged around at least one wheel (2) of a vehicle for cooperation with a bed. The device comprising a grouser (1) intended to extend substantially across the envelope surface of the wheel (2), two members connected to the grouser and arranged at a mutually distance for forming a support for the grouser (1) on each side of the wheel (2). Connection members (4) including at least one opening (5) for receiving a part of a link element (6) fo connecting to devices being adjacent with respect to the longitudinal direction of the band. At least one of the support members (3) and one fo the connection members (4) are arranged in one piece to form a combination element (7). The opening (5) of the combination element (7) endings in a surface which is directed towards the grouser (1).

16 Claims, 2 Drawing Sheets

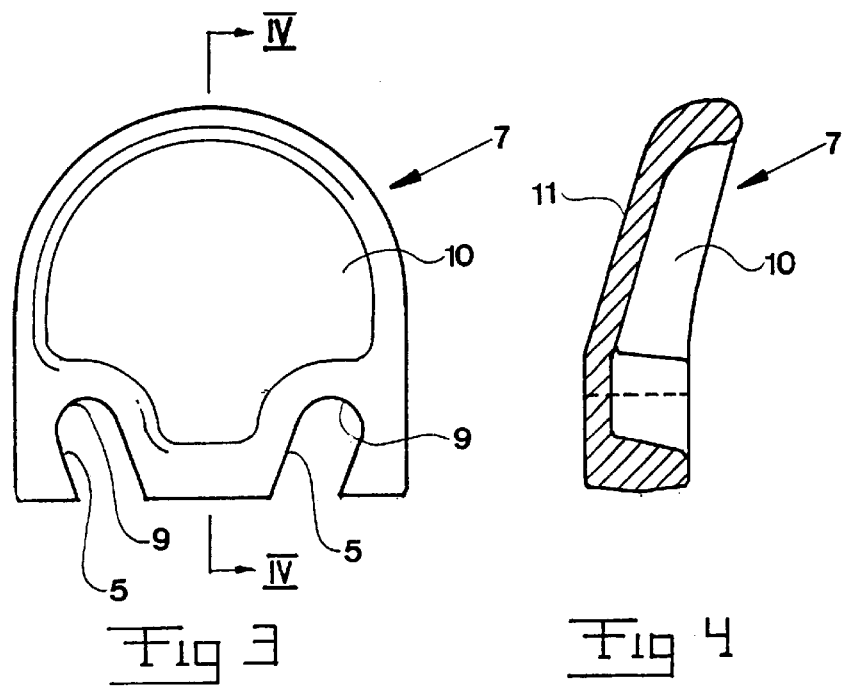
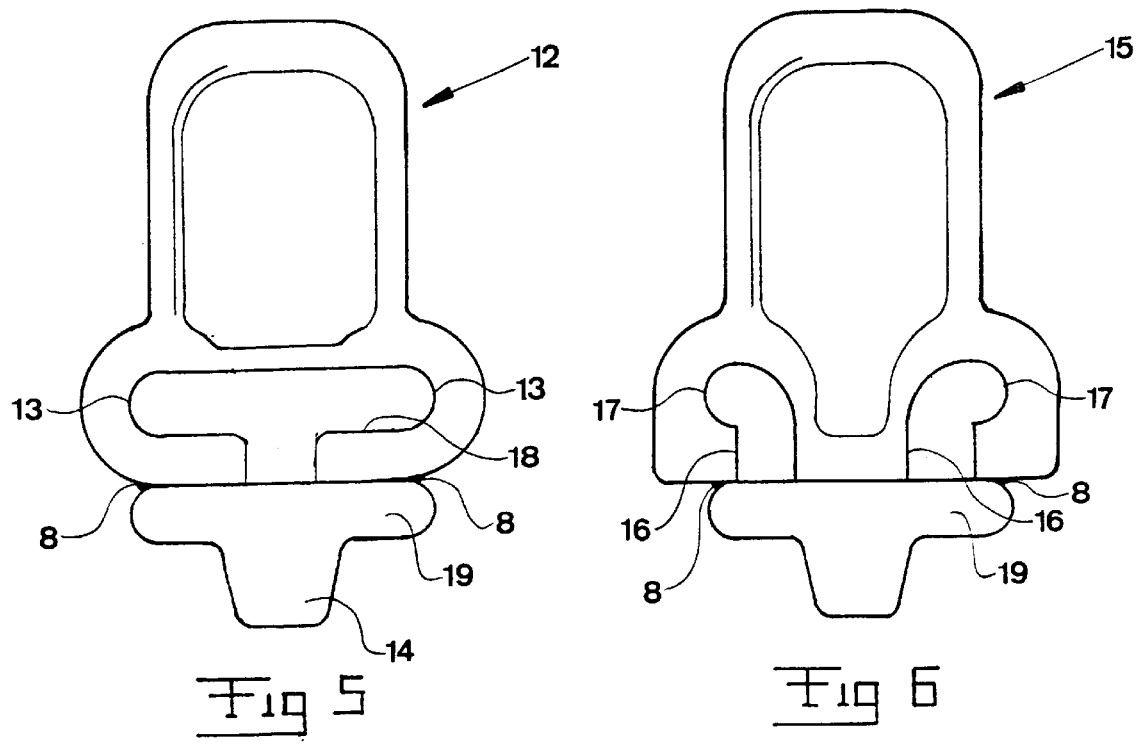

BAND DEVICE FOR VEHICLE WHEELS

FIELD OF THE INVENTION AND PRIOR ART

The present invention relates to a device constituting a part of a band. The band or track being intended to be arranged around at least one wheel of a vehicle for cooperation with the ground. The band and track are used interchangeably from hereinafter.

The band is intended to be used among other things to increase the carrying capacity and/or the pull power of a vehicle. Furthermore, the band is intended to protect the wheel or a tire arranged around the wheel against mechanical damage.

Preferably the device is used to band wheels of forest machines, farming tractors, lorries or trucks, trailers, etc.

According to prior art the connection member is constituted by a separate part having the shape of a hook. Such a hook-shaped part is intended to be attached at the respective end of the actuating member or grouser in such a way that a portion of the hook-shaped part located opposite to the opening is attached at the actuating member or grouser. The actuating member and grouser are used interchangeably from hereinafter. When assembling a band or track two link elements are arranged around the body of the hook-shaped part, one link element on each side of the opening to the hook-shaped part. Subsequently, a support member is attached to the hook-shaped part. The attachment of the support member is done on one hand to the portion of the hook-shaped part located opposite to the opening, and on the other to the respective end of the hook-shaped part, the ends defining the opening. By that the opening to the hook-shaped part will be closed and, with a suitable design of the hook-shaped part, two new openings will be created between the hook-shaped part and the support member, the new openings accommodating a portion of the respective link element in case of a correctly holding of the link elements when attaching the support member.

The attachment of the hook-shaped part to the actuating member and the attachment of the support member to the hook-shaped part is conventionally done by means of welding. When attaching the support member to the hook-shaped part according to prior art, four welding seams are arranged, one seam at the respective end of the hook-shaped part, and two welding seams for attaching the support member to the portion of the hook-shaped part arranged opposite to the opening. The welding is time consuming and expensive and therefor it would be appreciated to achieve a device having as few welding seams required as possible while maintaining the functions of the device.

It would also be desirable to reduce the welding because the gases released to the surroundings during welding have negative effects on the environment.

SUMMARY OF THE INVENTION

The object of the present invention is to provide a device which eliminates the disadvantages mentioned above in such devices already known.

This object is according to the invention obtained by that at least one of the support members and one of the connection members are arranged in one piece while forming a combination element and by that the opening of the combination element ends in a surface directed towards the actuating member or grouser.

By forming a combination element instead of the support member and the hook-shaped part according to prior art, the number of welding seams required are reduced to the welding seams that are required for attaching the combination element at the actuating member only. Furthermore, by the fact that at least one of the openings for receiving a part of a link element ends in a surface of the combination element directed towards the actuating member, even the assembling of the device is simplified and the time required for the assembling is reduced.

According to a preferred embodiment of the invention, in which the respective support member and the respective connection member are arranged in one piece, said device enabling a safe connecting of the device to adjacent devices by that the device is enable to be connected to adjacent devices on each side of the wheel.

According to another preferred embodiment, in which the connecting of the two support members to each other is designed to enable application of the device to wheels with an arbitrary envelope surface shape, the band device is applicable on an arbitrary vehicle wheel with or without tires, i.e. the band requires not requiring any special design of the envelope surface of the wheel and thereby the device may be used to a large set of different vehicles with different characteristics and different wheel types with different envelope surface design or different design of accompanying tires.

BRIEF DESCRIPTION OF THE DRAWINGS

With reference to the appended drawings below follows a detailed description of preferred embodiments of the invention cited as examples.

FIG. 3 shows a front view of a combination element according to a first preferred embodiment of the invention.

FIG. 4 shows a cross-section of the combination element according to FIG. 3.

FIG. 5 shows a front view of a second embodiment of the combination element according to the invention, the combination element being connected to an actuating member or grouser.

FIG. 6 shows a front view of a third embodiment of the combination element according to the invention, the combination element being connected to an actuating member or grouser.

DETAILED DESCRIPTION OF PREFERRED EMBODIMENTS OF THE INVENTION

Figure 1:
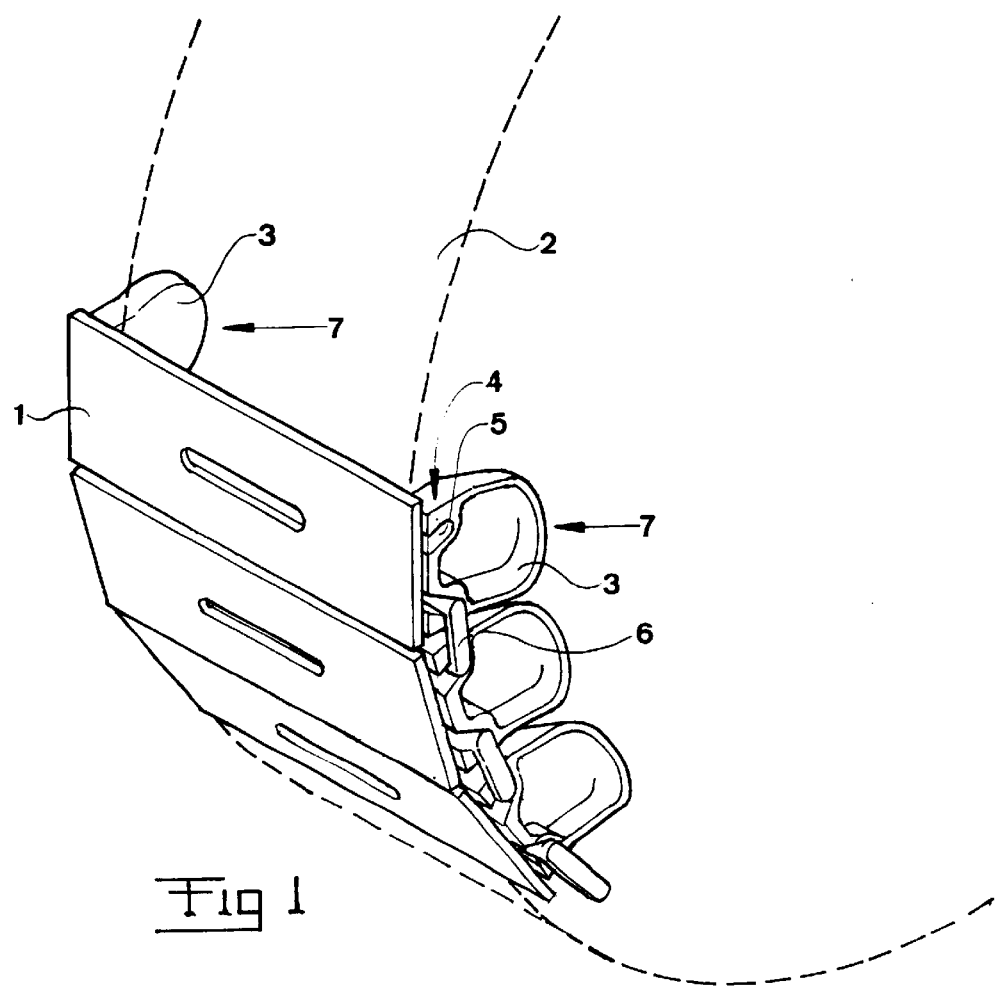
FIG. 1 shows a perspective view of three devices according to the invention, the devices being mutually connected via link elements and arranged around a wheel schematically illustrated.

FIG. 1 illustrates a perspective view of the device according to the invention, the device being arranged at a wheel schematically illustrated. The device constitutes a part of a band or track and is connected to devices being adjacent with respect to the longitudinal direction of the band or track by means of link elements. The device comprises an actuating member or grouser 1, the grouser being intended to extend substantially across the envelope surface or the radial circumference surface of the wheel 2. This actuating member or grouser co-operates with the bed or ground and has preferably a plate-like shape. However, within the scope of the claims according to the invention the actuating member or grouser may be designed in several different ways with different dimensions and with different shapes with the purpose to be applied at different wheel types of different vehicles and machines to achieve the effect required regarding for example good carrying, pull power and a good protection of the wheels against mechanical damage. The grouser may for instance on its surface located opposite to the wheel have means for achieving a good engagement with a bed or ground, in the form of for example a grooved structure or in the form of one or several ribs, see for example FIG. 5 and FIG. 6.

In the preferred embodiment of the actuating member 1 illustrated in FIG. 1, the actuating member extends in the lateral direction only somewhat further than the width of the wheel 2. However, it is possible to arrange actuating members having a substantially further extension than the width of the wheel in the lateral direction of the wheel. In the embodiment of the device illustrated in FIG. 1 two adjacent actuating members are arranged at a small mutually distance. Such a design is first of all advantageously when the band is intended to protect the wheel against mechanical damage. However, it is also possible to use link elements having such a length in the longitudinal direction of the band that adjacent actuating members will be arranged at a substantially larger mutually distance, which for instance may be desirable when the band is applied around the wheel to enhance its pull power to some extent.

The band or track formed by the devices according to the invention is intended to be applied around one or several wheels. With the definition wheel herein it means that the wheel may also have a tire around its circumference and if so the device will bear against the tire. The surface of the actuating member or grouser, which surface is directed towards the wheel/tire, is substantially plane and accordingly the actuating member or grouser is not in any way limited to the use of special wheel types. On the contrary the band or track device according to the invention is applicable on a large number of different wheel types having different envelope surfaces or different design of accompanying tires.

Furthermore, the device comprises two members 3 connected to the actuating member or grouser 1 and arranged at a mutually distance to form a support for the actuating member or grouser on each side of the wheel 2 in the lateral direction of the wheel 2. The respective support member 3 and the respective connection member 4 are in one piece, the respective support member 3 and the respective connection member 4 together forming a combination element 7, the combination element showing at least one opening 5 for receiving a part of a link element 6.

Figure 2:
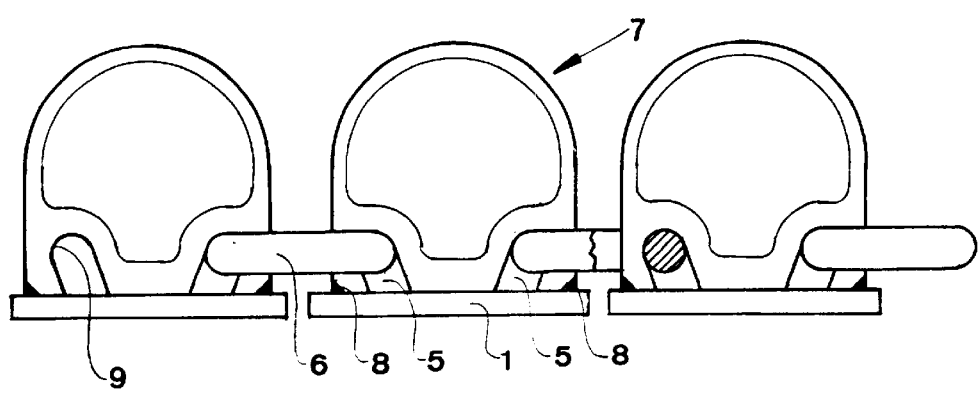
FIG. 2 shows a side elevation of the devices according to FIG. 1 in a position where the band formed by the devices extends rectilinearly.

FIG. 2 illustrates a side elevation of the device according to the invention. The band formed by a number of devices is arranged along a plane. The assembling of the device may be done quickly and in an easy way because of the design of the device according to the invention. When assembling the band, a link element 6 is first brought into the respective opening 5 and then the combination element 7 and the actuating member I are connected through welding. However, the interconnecting of the combination element 7 and the actuating member 1 may be done for instance by means of a screw joint or a glue joint without departing from the scope of the claims according to the invention.

When arranging the band around one or several wheels the respective link element will due to the design of the openings lie close to a respective site intended therefor, in a so called seat 9, the seat being arranged at the closed end of the respective opening 5. The link element 6 will act like a hinge in the band through its location in the openings 5.

FIG. 3 illustrates a side elevation of a first preferred embodiment of the combination element 7. Two openings 5 are arranged to respectively receive a link element. The part of the link element that is intended to be arranged in the opening 5 preferably has a circular cross-section shape, see FIG. 2, with the purpose to achieve the hinge function mentioned earlier. The seat 9 arranged for receiving the link element part of the respective opening 5 is arranged closer to the nearest adjacent combination element than the mouth of the opening 5. By tightening the band, when arranging the band at a wheel, it will be ensured that the link element part is arranged in the seat 9 intended therefor.

FIG. 4 illustrates a cross-section view of the combination element according to IV—IV in FIG. 3. The combination element 7 has a shell-shaped recess 10, see FIG. 3, in order to reduce the material consumption of the combination element 7 is angled in its vertical direction. When arranging the device at a wheel, the wheel is intended to bear against or at least being arranged in the proximity of the surface 11 of the combination element 7 arranged opposite to the recess 10. Since a tire arranged around a wheel generally is rounded in the transition between the envelope surface and the lateral surfaces thereof, the surface 11 of the combination element 7, outwardly directed in relation to the tire, creates a large contact surface desired against the tire in case of a lateral displacement of the device in relation to the tire.

FIG. 5 illustrates a second preferred embodiment of a combination element 12. The combination element has only one opening 18 which has the shape of a T. The T-shaped opening 18 has at the inner ends thereof seats 13 intended for link element parts. An actuating member or grouser 19 has in this connection a rib 14 running in the longitudinal direction thereof, i.e. in the lateral direction of the wheel, the rib being arranged to achieve a good engagement with the ground.

FIG. 6 illustrates a third preferred embodiment of a combination element 15. The difference between the combination element according to the first and third embodiment is first of all that the openings 16 in the third embodiment extend substantially perpendicular from the surface of the combination element directed towards the actuating member or grouser, the openings 16 having seats 17 at their inner ends for receiving link element parts. The seats 17 are in this connection designed as recesses in the longitudinal direction of the band, i.e. recesses in the direction towards adjacent combination elements and substantially perpendicular to the surface of the combination element.

It is stressed that the embodiments described above and illustrated in the drawing should be considered as examples only. Thus, the invention may be realised in different ways without departing from the basic idea of the invention. In particular, it is pointed out that a man skilled in the art is capable of making various modification of the exemplified embodiments, after receiving knowledge about the solution of the invention, without departing from the scope of the claims.

The grouser according to the description above has a substantially plate-like shape and the combination elements are intended to project from the respective end of the grouser. However, the grouser may have other designs including for example parts protruding from the grouser, the grouser being plate-like for the rest. These parts are suitably located at the respective end of the grouser and extend substantially parallel with respective lateral surface of the wheel and preferably in the direction towards the center axis of the wheel. In this case, the grouser nearly has a cross-section, taken from one end of the grouser to the other end thereof along the width of the wheel, having substantially the shape of an U, the each combination element being attached to the respective protruding part of the grouser. The respective combination element may by that be attached either on the inside of respective protruding part, i.e. on the surface of the respective protruding part directed towards the lateral surface of the wheel, or on the outside of the respective protruding part, i.e. on the surface of the respective protruding part directed away from the lateral surface of the wheel the combination elements will in both cases, at least in some extension, overlap the protruding parts.

The seats of the respective opening in case of overlapping connection are suitably arranged at a distance from the respective surface of the respective protruding part, which means that a space is arranged, making it possible to arrange the respective link element between the protruding part and the part of the combination element in which the seat is located.

Furthermore, the support member may have a number of different appearances without departing from the basic idea of the invention. The support member may for instance have one or several pins or a plate-like shape. Furthermore, the support member may have a rounded shape, or a shape angled outwardly in relation to the wheel to achieve a suitable contact surface against the wheel/tire.

What is claimed is:

1. A track device arranged around at least one wheel of a vehicle for cooperation with ground, said track device comprising:
   a plurality of grousers, each said grouser extending substantially across a surface of the wheel and acting upon the ground when in contact for providing traction,
   at least two support members connected to each one of said grousers at a mutually spaced distance from each other to place each one of said grousers in a perpendicular relationship with said surface of the wheel and each of said two support members having an inner smooth side for positioning on each side of the wheel in a lateral direction of the wheel,
   at least two connection members, each said connection member forming a base on each said support member and securely connecting said support member to said grouser, said base having at least one opening extending away from said grouser and forming a seat against the inner smooth side of said supporting member,
   at least one link element for link connecting each said plurality of grousers to each other, each said link element having two projections for entering said opening and resting in said seat of said connection member of an adjacent grouser, and
   at least one of said openings extending nearly perpendicular with the ground when at least two of said grousers are on said wheel and in nearly full contact with said ground for receiving said link element, and at least two of said link elements being nearly parallel to the ground when secured to the adjacent connection members.

2. The device according to claim 1, wherein said respective support member and said connection member are arranged in one piece for forming at least one combination element.

3. The device according to claim 2, wherein the opening has two seats, each said seat receiving said link element.

4. The device according to claim 2, wherein two of said openings are arranged in the respective combination element, and said respective opening has the seat for receiving said link element.

5. The device according to claim 4, wherein the respective seat pivots the link element about an axis extending in parallel with the transversal direction of the track device.

6. The device according to claim 1, wherein the actuating member has a plate-like shape.

7. The device according to claim 6, wherein the actuating member has two parts, each said part protruding in the lateral direction of the track device, said parts extending substantially in parallel with the respective lateral surface of the vehicle wheel, and the respective combination element and the respective protruding part are connected.

8. The device according to claim 5, wherein the respective combination element and the respective protruding part overlappingly connecting the respective seat, and being arranged at a distance from the respective protruding part for forming a space, and arranging the respective link element between the protruding part and the part of the combination element in which the seat is located.

9. The device according to claim 7, wherein the actuating member has a cross-section taken from one end of the actuating member to the other end thereof along the width of the wheel and having substantially the shape of an U.

10. The device according to claim 3, wherein the respective seat being arranged for receiving the respective link element closer to a nearest adjacent combination element than the opening.

11. The device according to claim 1, wherein the combination element is angled outwardly in its vertical direction to correspond with the shape of the wheel.

12. The device according to claim 1, wherein the combination element is a large contact surface and is produced for the wheel.

13. The device according to claim 1, wherein the connection of the two support members to each other enables the device to said wheels with an arbitrary envelope surface shape.

14. The device according to claim 13, wherein the actuating member enables application of the device to wheels with an arbitrary envelope surface shape.

15. The device according to claim 1, wherein the the inner smooth side of said supporting member is a large contact surface produced for a tire.

16. A track device for fitting around at least one wheel of a vehicle for providing traction with ground, said track device comprising:
   a plurality of grousers, each said grouser extending substantially across a perpendicular surface of the wheel, each said grouser having two ends,
   at least two support members connected to each one of said ends of said grousers and being mutually spaced from each other, said two support members placing each one of said grousers in a perpendicular relationship to said surface of the wheel, and each of said two support members having only an inner smooth side for smoothly sliding on an inner and outer side of the wheel in a lateral direction of the wheel,
   at least two connection base members, each said connection member having a base for securely connecting said support member to said grouser, said base having at least one recess opening extending away from said grouser to form a seat area against the inner smooth side of said supporting member with said seat area being larger than said opening,
   at least one link element for link connecting each said plurality of grousers to each other in a chain link fashion, each said link element having two perpendicularly extending projections with a larger outer end for entering said opening and resting in said larger seat area of said connection member of an adjacent grouser, and at least one of said openings extending nearly perpendicular with the ground when at least two of said grousers are on said wheel and in nearly full contact with said ground for receiving said link element, and at least two of said link elements being nearly parallel to the ground when secured to the adjacent connection members with said projection larger outer end movingly resting in said seat area.

* * * * *